United States Patent
Gamon et al.

(10) Patent No.: US 11,328,259 B2
(45) Date of Patent: *May 10, 2022

(54) AUTOMATIC TASK EXTRACTION AND CALENDAR ENTRY

(71) Applicant: Microsoft Technology Licensing, LLC, Redmond, WA (US)

(72) Inventors: Michael Gamon, Seattle, WA (US); Saliha Azzam, Redmond, WA (US); Yizheng Cai, Sammamish, WA (US); Nicholas Caldwell, Bellevue, WA (US); Ye-Yi Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,277

(22) Filed: Feb. 4, 2021

(65) Prior Publication Data
US 2021/0158300 A1 May 27, 2021

Related U.S. Application Data

(63) Continuation of application No. 13/170,660, filed on Jun. 28, 2011, now Pat. No. 10,984,387.

(51) Int. Cl.
*G06Q 10/10* (2012.01)

(52) U.S. Cl.
CPC ......... *G06Q 10/107* (2013.01); *G06Q 10/109* (2013.01)

(58) Field of Classification Search
CPC ............ G06Q 10/06314; G06Q 10/10; G06Q 10/107; G06Q 10/1093; G06Q 50/32; G06F 15/0266
See application file for complete search history.

(56) References Cited

U.S. PATENT DOCUMENTS 5,864,848 A * 1/1999 Horvitz ................. G06F 40/274
6,278,996 B1 * 8/2001 Richardson .......... G06Q 10/107
(Continued)

FOREIGN PATENT DOCUMENTS

EP    1109121 A2 * 6/2001 .......... G06Q 10/109
EP    1953723 A2   8/2008
GB    2488976 A   9/2012

OTHER PUBLICATIONS

Liu et al, "Meeting Runner: An Automatic Email-Based Meeting Scheduler," Copyright 2002 (Year: 2002).*
(Continued)

*Primary Examiner* — Alvin H Tan
(74) *Attorney, Agent, or Firm* — NovoTechIP International PLLC

(57) ABSTRACT

Automatically detected and identified tasks and calendar items from electronic communications may be populated into one or more tasks applications and calendaring applications. Text content retrieved from one or more electronic communications may be extracted and parsed for determining whether keywords or terms contained in the parsed text may lead to a classification of the text content or part of the text content as a task. Identified tasks may be automatically populated into a tasks application. Similarly, text content from such sources may be parsed for keywords and terms that may be identified as indicating calendar items, for example, meeting requests. Identified calendar items may be automatically populated into a calendar application as a calendar entry.

20 Claims, 6 Drawing Sheets

(56) References Cited

U.S. PATENT DOCUMENTS

| | | | | |
|---|---|---|---|---|
| 6,327,581 B1* | 12/2001 | Platt | ...................... | G06K 9/6256 |
| | | | | 706/12 |
| 6,505,167 B1* | 1/2003 | Horvitz | ................ | G06Q 10/109 |
| | | | | 705/7.21 |
| 6,553,358 B1* | 4/2003 | Horvitz | ................ | G06Q 10/107 |
| | | | | 705/39 |
| 6,816,885 B1 | 11/2004 | Raghunandan | | |
| 7,158,980 B2* | 1/2007 | Shen | ................... | G06Q 10/107 |
| 7,496,500 B2* | 2/2009 | Reed | ................... | G06Q 10/107 |
| | | | | 704/9 |
| 7,584,253 B2* | 9/2009 | Curbow | ............... | G06Q 10/107 |
| | | | | 709/206 |
| 8,055,707 B2* | 11/2011 | Desai | ................... | G06Q 10/107 |
| | | | | 709/204 |
| 8,082,308 B1* | 12/2011 | Filev | .................... | G06Q 10/103 |
| | | | | 709/206 |
| 8,326,859 B2* | 12/2012 | Paek | ....................... | G06Q 10/10 |
| | | | | 707/767 |
| 8,423,347 B2* | 4/2013 | Tunning | .............. | G06F 16/3329 |
| | | | | 704/9 |
| 8,484,745 B2* | 7/2013 | Bank | ...................... | G06Q 10/00 |
| | | | | 726/28 |
| 8,694,593 B1* | 4/2014 | Wren | ...................... | H04L 51/32 |
| | | | | 709/206 |
| 8,832,205 B2* | 9/2014 | Nelson | ................. | G06Q 10/109 |
| | | | | 709/206 |
| 8,856,246 B2* | 10/2014 | Post | ..................... | G06Q 10/103 |
| | | | | 709/206 |
| 8,943,071 B2* | 1/2015 | Bishop | .................... | G06F 16/93 |
| | | | | 707/748 |
| 9,141,940 B2* | 9/2015 | Pocklington | ......... | G06Q 10/107 |
| 9,529,864 B2* | 12/2016 | Sundelin | ........... | G06F 16/24575 |
| 9,842,319 B2* | 12/2017 | Carroll | ................. | H04L 51/046 |
| 10,430,732 B2* | 10/2019 | Zumwalt | .......... | G06Q 10/06311 |
| 2002/0076109 A1* | 6/2002 | Hertzfeld | .............. | G06F 40/284 |
| | | | | 382/229 |
| 2003/0135565 A1* | 7/2003 | Estrada | .................. | G06Q 10/10 |
| | | | | 709/206 |
| 2004/0148356 A1* | 7/2004 | Bishop, Jr. | .............. | H04L 51/38 |
| | | | | 709/206 |
| 2007/0005409 A1* | 1/2007 | Boss | .................. | G06Q 10/1095 |
| | | | | 705/7.19 |
| 2008/0040189 A1* | 2/2008 | Tong | ....................... | H04L 61/30 |
| | | | | 705/7.13 |
| 2008/0172606 A1* | 7/2008 | White | ................. | G06F 16/3334 |
| | | | | 715/254 |
| 2008/0301094 A1* | 12/2008 | Zhu | ......................... | G06F 16/34 |
| 2009/0063993 A1* | 3/2009 | Nyamgondalu | ..... | G06Q 10/109 |
| | | | | 715/752 |
| 2009/0235280 A1* | 9/2009 | Tannier | ................... | G06Q 10/00 |
| | | | | 719/318 |
| 2009/0248480 A1* | 10/2009 | Miksovsky | ........ | G06Q 10/1095 |
| | | | | 705/7.19 |
| 2010/0063882 A1* | 3/2010 | Danieli | .................. | G06Q 30/02 |
| | | | | 705/14.61 |
| 2010/0070877 A1* | 3/2010 | Scott | .................... | G06Q 10/109 |
| | | | | 715/751 |
| 2013/0007648 A1* | 1/2013 | Gamon | ................ | G06Q 10/109 |
| | | | | 715/771 |
| 2013/0179440 A1* | 7/2013 | Gordon | .................. | G06Q 30/02 |
| | | | | 707/731 |
| 2013/0332858 A1* | 12/2013 | Weber | ..................... | G06Q 50/01 |
| | | | | 715/753 |
| 2014/0214404 A1* | 7/2014 | Kalia | ...................... | G06F 40/40 |
| | | | | 704/9 |
| 2015/0199652 A1* | 7/2015 | Zuger | ................ | G06Q 10/1095 |
| | | | | 705/7.19 |

OTHER PUBLICATIONS

"Office Action Issued in Australian Patent Application No. 2016265257", dated Jul. 13, 2021, 5 Pages.

"Office Action Issued in New Zealand Patent Application No. 736061", dated Aug. 2, 2021, 5 Pages.

"Office Action Issued in Malaysian Patent Application No. PI2017704110", dated Aug. 27, 2021, 3 Pages.

"Office Action Issued in Philippines Patent Application No. 12017550119", dated Oct. 15, 2021, 6 Pages.

"Office Action Issued in Australian Patent Application No. 2016265257", dated Nov. 22, 2021, 4 Pages.

"Examiner's Decision of Final Refusal Issued in Chinese Patent Application No. 201680028053.1", dated Mar. 25, 2021, 11 Pages.

"Office Action Issued In Japanese Patent Application No. 2017-559498", dated Mar. 30, 2021, 6 Pages.

"Office Action Issued in Australia Patent Application No. 2016265257", dated Feb. 18, 2021, 06 Pages.

"Office Action Issued in New Zealand Patent Application No. 736061", dated Mar. 4, 2021, 4 Pages.

"Office Action Issued in Australian Patent Application No. 2016265257", dated Apr. 28, 2021, 6 Pages.

"Office Action Issued in New Zealand Patent Application No. 736061", dated Jun. 9, 2021, 6 Pages.

"Office Action Issued in Australian Patent Application No. 2016265257", dated Jan. 24, 2022, 4 Pages.

* cited by examiner

AUTOMATIC TASK EXTRACTION AND CALENDAR ENTRY

CROSS-REFERENCE TO RELATED APPLICATIONS

This application is a continuation application of U.S. patent application Ser. No. 13/170,660, entitled "AUTOMATIC TASK EXTRACTION AND CALENDAR ENTRY," filed on Jun. 28, 2011, the entire disclosure of which is hereby incorporated herein by reference.

BACKGROUND

Within any number of business, social or academic enterprises, electronic mail typically serves as the primary source of communication among members of the enterprise, as well as, among members of the enterprise and persons outside the enterprise. Unfortunately, typical electronic mail (email) users receive and review tens or even hundreds of email messages on a daily basis and the users often have trouble managing and prioritizing incoming electronic mail items. This is especially problematic when the messages contain requests or tasks that need a response or follow-up by the receiving user. In particular, many users often receive tasks or job assignments as part of individual electronic mail messages, for example, "Please redesign the company web site by next Friday," but because the example task is embedded in an electronic mail message, the user may fail to generate a corresponding electronic task or calendar item to remind the user to complete the given task.

Similarly, email and other electronic communications often have embedded content that may be considered calendar entries, but that may be overlooked by the receiver. For example, a statement may be included in an email message like "Let's meet for lunch at 2:00 p.m. on Thursday." Such a statement, particularly if responded to, is very similar to a calendar entry, but if the user forgets to mark his/her calendar with the stated meeting, he/she may miss the meeting.

It is with respect to these and other considerations that the present invention has been made.

SUMMARY

Embodiments of the present invention solve the above and other problems by providing automatic detection of tasks and calendar items from electronic communications for populating into associated tasks applications and calendaring applications. Text content retrieved from one or more electronic communications, for example, electronic mail items, text messages, Internet-based chat sessions, and the like may be extracted and parsed for determining whether keywords or terms contained in the parsed text may lead to a classification of the text content or part of the text content as a task. Identified tasks may be presented to a user for verification, and if accepted, may be automatically populated into the user's tasks application or in tasks applications of other users, as required. Similarly, text content from such sources may be parsed for keywords and terms that may be identified as indicating calendar items, for example, meeting requests. Identified calendar items may be presented to the user for verification, and if accepted, may be automatically populated into the user's calendar application as a calendar entry or may be automatically populated into the calendar applications of other users, as required.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
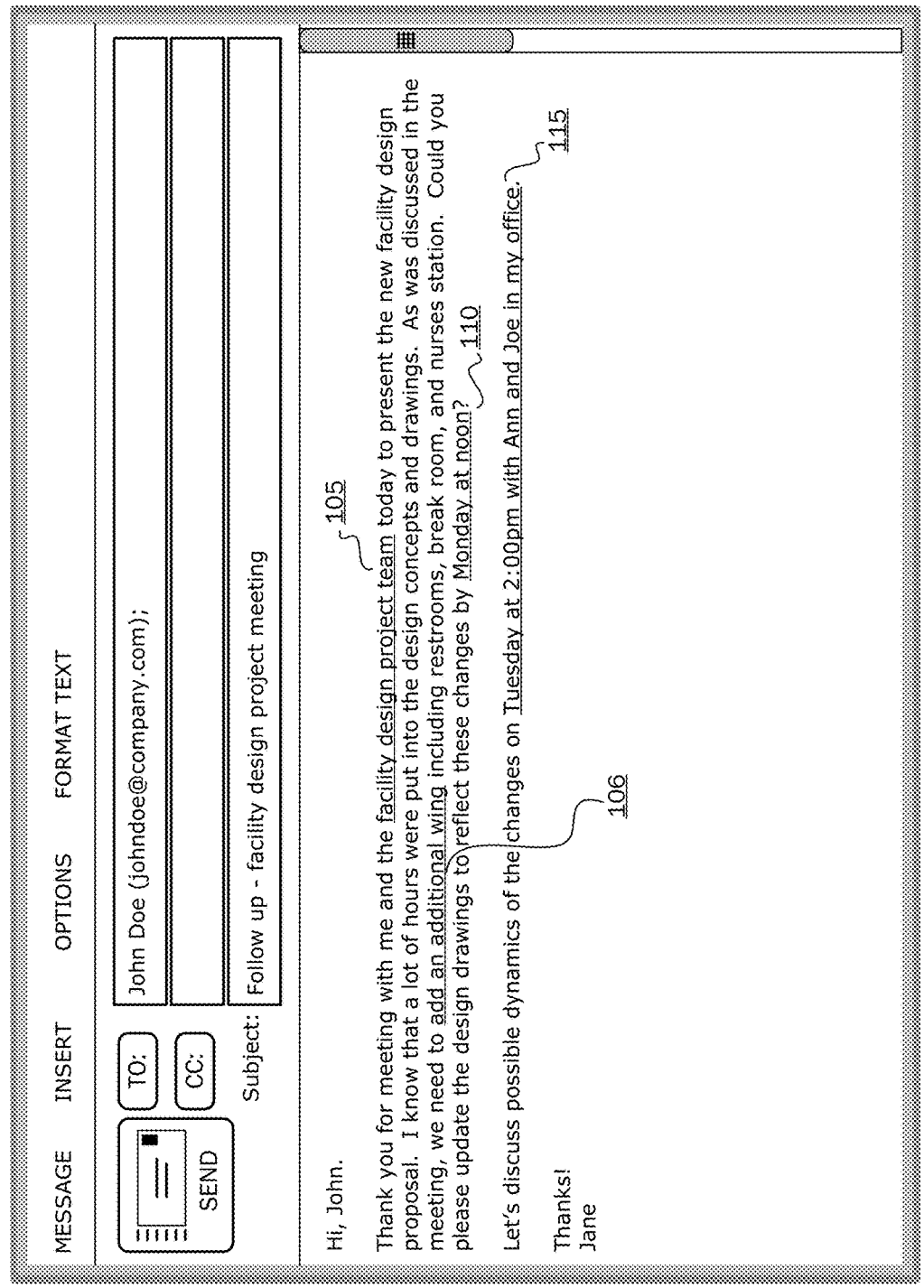
FIG. 1 illustrates a screen shot of a computer-generated user interface showing an example electronic mail item containing potential task and calendar item information.

As briefly described above, embodiments of the present invention are directed to automatically classifying information extracted from one or more text sources, for example, electronic mail items, text messages, Internet-based chat forums, and the like as tasks or calendar items. Extracted information classified as tasks or calendar items may be presented to a user for verification/acceptance. If the user accepts the recommended tasks or calendar items, the accepted tasks may be automatically populated into the user's tasks application and tasks list, and the accepted calendar items may be automatically populated into the user's calendar application as a calendar entry. Similarly, such accepted tasks and calendar items may be populated into the tasks or calendar applications of other users, as required. For example, if an item is classified and accepted as a task that requires activity from multiple users, the task may be presented to each of the multiple users for acceptance, or the task may be automatically populated into the tasks list of the multiple users. Likewise, if an item is classified as a calendar entry, the calendar entry may be populated into the calendar applications of one or more users, for example, as meeting requests that may be accepted by one or more users upon automatic sending of a meeting request in response to the classification of a content item as a meeting request.

The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Referring now to the drawings, in which like numerals represent like elements through the several figures, aspects of the present invention and the exemplary operating environment will be described. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates a screen shot of a computer-generated user interface showing an example electronic mail item containing potential task and calendar item information. The user interface 100, illustrated in FIG. 1, is illustrative of any computer-generated user interface in which may be displayed various text content and from which task items and calendar items may be automatically extracted according to embodiments of the invention. For example, the user interface 100 is illustrative of a typical electronic mail application user interface in which may be displayed electronic mail items sent and received to and from various users. As should be appreciated, the user interface 100 may similarly be illustrative of a user interface for text messaging, a user interface for Internet-based chat sessions, or the like. In addition, the user interface 100 may be illustrative of an interface for including various documents, for example, word processing documents, spreadsheet documents, slide presentation application documents, and the like. That is, the user interface 100 is equally illustrative of any user interface in which information may be presented and from which one or more tasks or calendar items may be extracted and classified, as described herein.

Referring to the example electronic mail item contained in the user interface 100, an electronic mail message contains various text-based information items. As illustrated in the first sentence of the example electronic mail message, the phrase "facility design project team" 105 is noted and contains terms that may be used for applying extracted information to one or more tasks, calendar entries, and the like. A phrase 106 is also noted stating "add an additional wing" which may be utilized as described herein for extracting and classifying a task item such as a task of "add an additional wing" as part of a building project. Another phrase 110 of "Monday at noon" is noted which may be extracted and classified as a potential calendar item. Finally, another phrase 115 of "Tuesday at 2:00 p.m. with Ann and Joe in my office" contains information that may be utilized for generating a calendar entry that may be automatically populated into the receiving user's calendar application and also in the calendar applications of the two other users identified in the phrase 115.

Figure 2:
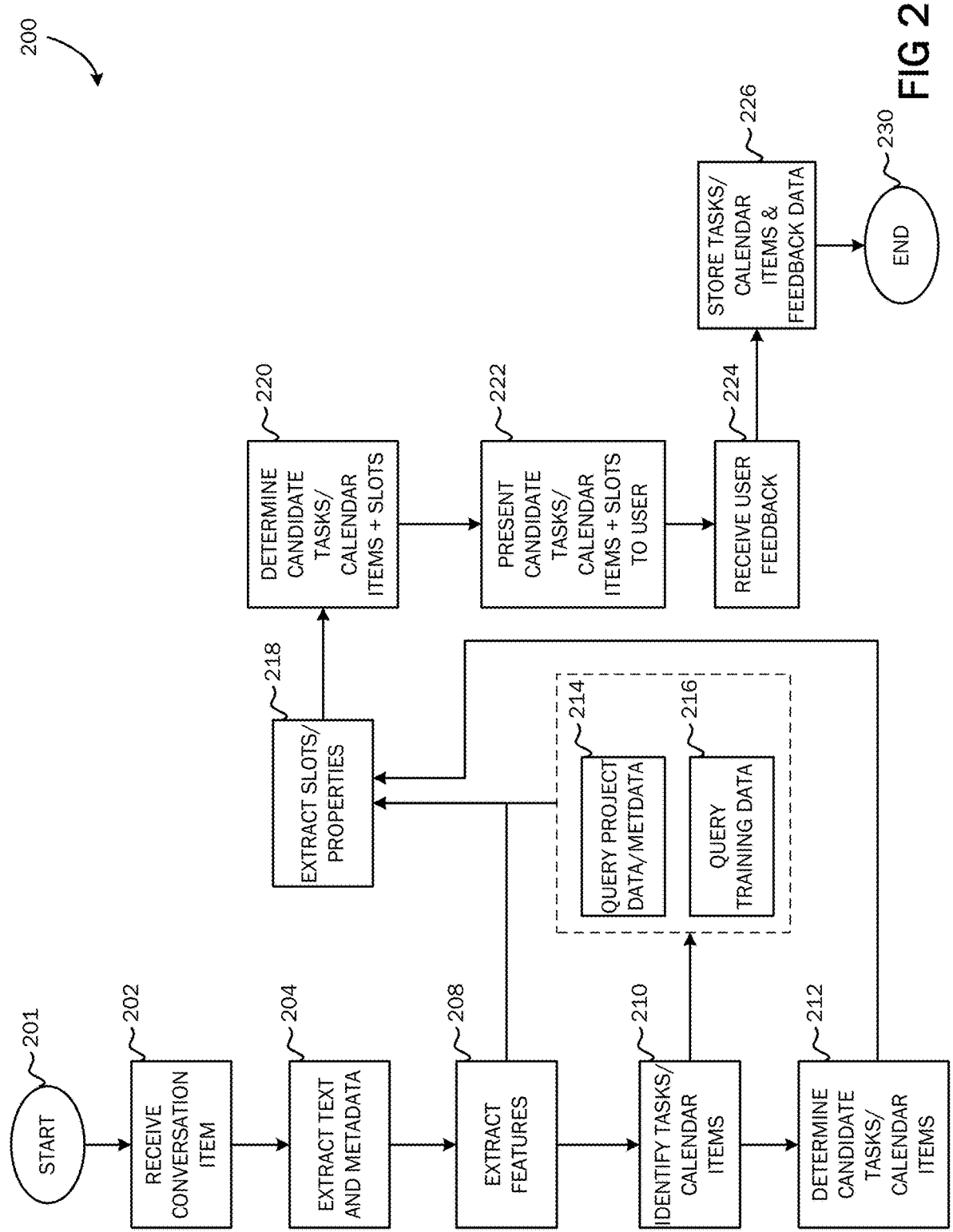
FIG. 2 illustrates a system architecture and process flow for automatically identifying task items and calendar items from received content.

FIG. 2 illustrates a system architecture and process flow for automatically identifying task items and calendar items from received content. The method 200 begins at operation 201 and proceeds to component/operation 202 where a conversation item is retrieved for analysis and possible classification as a task item or calendar item. As described above with reference with FIG. 1, the received conversation item may include an electronic mail item, a text message, an Internet-based chat session, or the conversation item may be a document attached to a conversation item such as an electronic mail message having an attached word processing document where the attached word processing document may include information from which may be extracted potential tasks or calendar items.

At operation 204, text and associated metadata extracted from the received conversation item is analyzed and processed into individual text components (e.g., words, phrases, terms, numeric strings, and the like). Received text content and metadata are analyzed and formatted as necessary for text processing described below. According to embodiments, the text content and metadata analysis may be performed by a text parser operative to parse text content and metadata for processing the text into one or more text components (e.g., sentences and terms comprising the one or more sentences). For example, if the text content and metadata are formatted according to a structured data language, for example, Extensible Markup Language (XML), the text content and metadata analysis may include parsing the retrieved text content and metadata according to the associated structured data language for processing the text as described herein. For another example, the text content and metadata may be retrieved from an online source such as an Internet-based chat forum where the retrieved text may be formatted according to a formatting such as Hypertext Markup Language (HTML). According to embodiments, the text content and metadata analysis may include formatting of the retrieved text content and metadata from such a source so that it may be processed for conversation topics as described herein.

A text processing application may be employed whereby the text is broken into one or more text components for determining whether the received/retrieved text may contain terms that may be expertise tags or that may be used for searching for stored expertise tags. Breaking the text into the one or more text components may include breaking the text into individual sentences followed by breaking the individual sentences into individual tokens, for example, words, numeric strings, etc.

Such text processing is well known to those skilled in the art and may include breaking text portions into individual sentences and individual tokens according to known parameters. For example, punctuation marks and capitalization contained in a text portion may be utilized for determining the beginning and ending of a sentence. Spaces contained between portions of text may be utilized for determining breaks between individual tokens, for example, individual words, contained in individual sentences. Alphanumeric strings following known patterns, for example, five digit numbers associated with zip codes, may be utilized for identifying portions of text. In addition, initially identified sentences or sentence tokens may be passed to one or more recognizer programs for comparing initially identified sentences or tokens against databases of known sentences or tokens for further determining individual sentences or tokens. For example, a word contained in a given sentence may be passed to a database to determine whether the word is a person's name, the name of a city, the name of a company, or whether a particular token is a recognized acronym, trade name, or the like. As should be appreciated, a variety of means may be employed for comparing sentences or tokens of sentences against known, words, or other alphanumeric strings for further identifying those text items.

At component/operation 208, the processed text and metadata components are passed through a feature extraction process. According to an embodiment, the feature extraction process may include extracting relevant components from the text and the metadata processed from the received conversation item such that the extracted features may be used for identifying and classifying components of the received conversation item as a task item or calendar item. For example, as should be appreciated, some text components and associated metadata may be discarded as having no relevance to a potential task or calendar item. For example, standard language articles such as "a," "and," "the," and other terms not typically associated with a task or calendar item may be discarded.

Features extracted during the feature extraction process may include names contained in "To" lines, "From" lines and text contained within a received conversation item. Other features extracted may include dates, times, subject line, information associated with other recipients of the conversation item, and the like. In addition, individual text components, for example, words and phrases, extracted from the conversation item may be compared against lists of words and phrases maintained in a database of words and phrases to identify those words and phrases for potential use in a task or calendar item. For example, referring back to FIG. 1, the words "Ann" and "Joe" may be extracted from the phrase 115. Those words may be extracted from the text by the feature extraction process and may be compared against a database of words including names associated with a project of which a sender and receiver of the received conversation item may be members. If the extracted names are associated with users who are also members of the same project group or workspace, information may be retrieved for those users based on the extracted features for classifying that portion of the text as a potential task or calendar item associated with those users.

At component/operation 210, a task or meeting identification is performed. The task/meeting identification process may be performed in association with the project data/metadata component 214 and training data 210 for assistance in classifying extracted conversation item features as a task or calendar item. According to an embodiment, the task/meeting identification processing may be performed by a machine-learned classifier application by comparing the extracted conversation item features with other data/metadata including data/metadata contained in a given project workspace associated with the sender or various recipients of the received conversation item.

According to one embodiment, the task/meeting identification classifier application may be a linear support vector application. Other suitable algorithms may be used or combined with the linear support vector application including maximum entropy or conditional random fields algorithms, or these types of applications and algorithms may be combined with manually pre-defined patterns of text components matched against an input string to identify text components as a task or calendar item. For example, manually entered pre-defined patterns may include such phrases as "meet me at" followed by a date, time, or location that may be classified as a calendar entry. Other manually entered pre-defined text patterns may include text patterns typically associated with tasks such as the text pattern of "complete the project" followed by a date or time.

According to one embodiment, the tasks/meeting identification classifier application may be trained on manually labeled conversation item data, for example, electronic mail data, text messaging data, and the like, where the manually labeled data may consist of individual sentences or groups of sentences that are labeled as tasks, non-tasks, calendar items or non-calendar items. These sentences may be represented as feature vectors, and the task/meeting identification classifier application may be trained on these feature vectors as well as the metadata properties of the received conversation item from which those sentences are derived. As described above, such features may include, for example, conversation item authors, recipients, subject line information, and the like.

Continuing with the task/meeting identification operation 210, based on the extracted features and feature vectors generated during the feature extraction operation 208, the task/meeting identification classifier application may assign a probability that a sentence containing identified features contains a task or calendar item based on the feature vectors and metadata for the item. At operation 212, a candidate task or meeting item may be generated, and at operation 218, a slot/properties extractor application may use the information found in the input text and metadata and training data 214, 216 to extract slots like due dates, assignee, topic (for tasks), meeting date/time, attendees (for meeting items) and the like. According to an embodiment, use of training data 216 includes use of a data model or machine-learned classifier model built from training data.

At operation 220, resulting candidate tasks or meetings and associated slots may be assembled and may be presented 222 to a user as illustrated and described below with respect to FIG. 3. Presentation to the user allows the user to validate a presented task or meeting item, or allows the user to correct the presented task or meeting item and the properties of the presented task or meeting item that were extracted and automatically presented. At operation 224, if a user accepts a presented task or calendar item, or if the user corrects or replaces a presented task or calendar item, the accepted, corrected, or replaced task or calendar item may be stored in the project/calendar store 226.

As should be appreciated, storage of the accepted, corrected, or replaced task or calendar item may include automatically populating the task or calendar item into the user's task application or calendar application, and may include automatically presenting the task or calendar item to other users identified as part of the task or calendar item classification process. That is, if classification of a text string as including a task is accepted by the user, and the accepted task item includes identification of another user, then the task item may be presented to the other user for acceptance, or the task item may be automatically populated into the other user's task application. In the case of a project workspace, acceptance of a task or calendar item by a given user who is a member of the project workspace may cause the accepted task or calendar item to be automatically populated into a task application and associated tasks list or into an associated calendar application for all members of the project workspace to review. The system/method 200 ends at operation 230.

Figure 3:
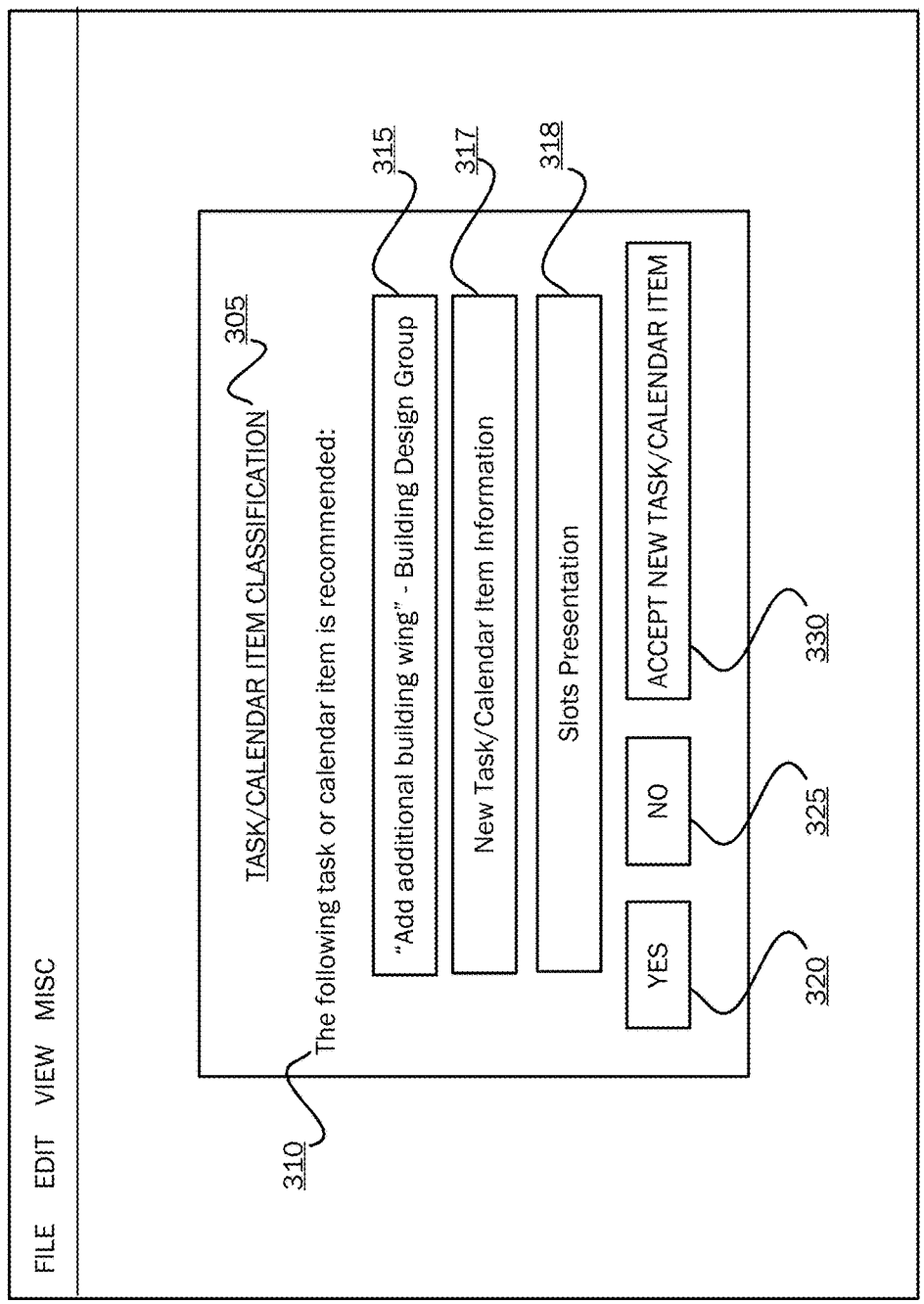
FIG. 3 illustrates a computer-generated screen shot of a task/calendar item verification user interface for allowing user verification of a recommended task or calendar item.

FIG. 3 illustrates a computer-generated screen shot of a task/calendar item verification/assignment user interface for allowing user verification of a recommended task or calendar item. The user interface 300 is illustrative of a user interface component in which text strings classified as task items or calendar items may be presented to a user for acceptance, correction, or replacement. The task/calendar item classification interface 305 includes a statement 310 such as "The following task or calendar item is recommended:" for identifying to a receiving user the nature of the user interface component. A text box/field 315 is provided for presenting the candidate task or calendar item. For example, an example task of "Add additional building wing" is illustrated in the text box 315, followed by an identification of a recommended project workspace or group to which the task would be added.

A new task/meeting item information text box or field 317 is included to allow a user to manually enter a replacement task or meeting item. If the user accepts the recommended task or calendar item, the recommended task or calendar item is stored and processed, as described above. If the user rejects the recommended task or calendar item, then the recommended task or calendar item is not stored and processed to various users as described above. If desired, the user may make corrections to the presented task or calendar item in the text box 315, or the user may enter a replacement task or calendar item in the text box or field 317.

A slots presentation text box or field 318 is illustrated for providing slot information for designated task or calendar items, for example, due dates, task assignee, task topic, meeting dates/times, meeting attendees and the like. As with the other presented information, the user may accept, reject, correct or replace slots information, as desired, via the user interface 305. Once the user accepts the new or corrected task item or calendar item, along with any relevant slots information, the new or corrected task item or calendar item may be stored and processed, as described above with reference to FIG. 2.

Figure 4:
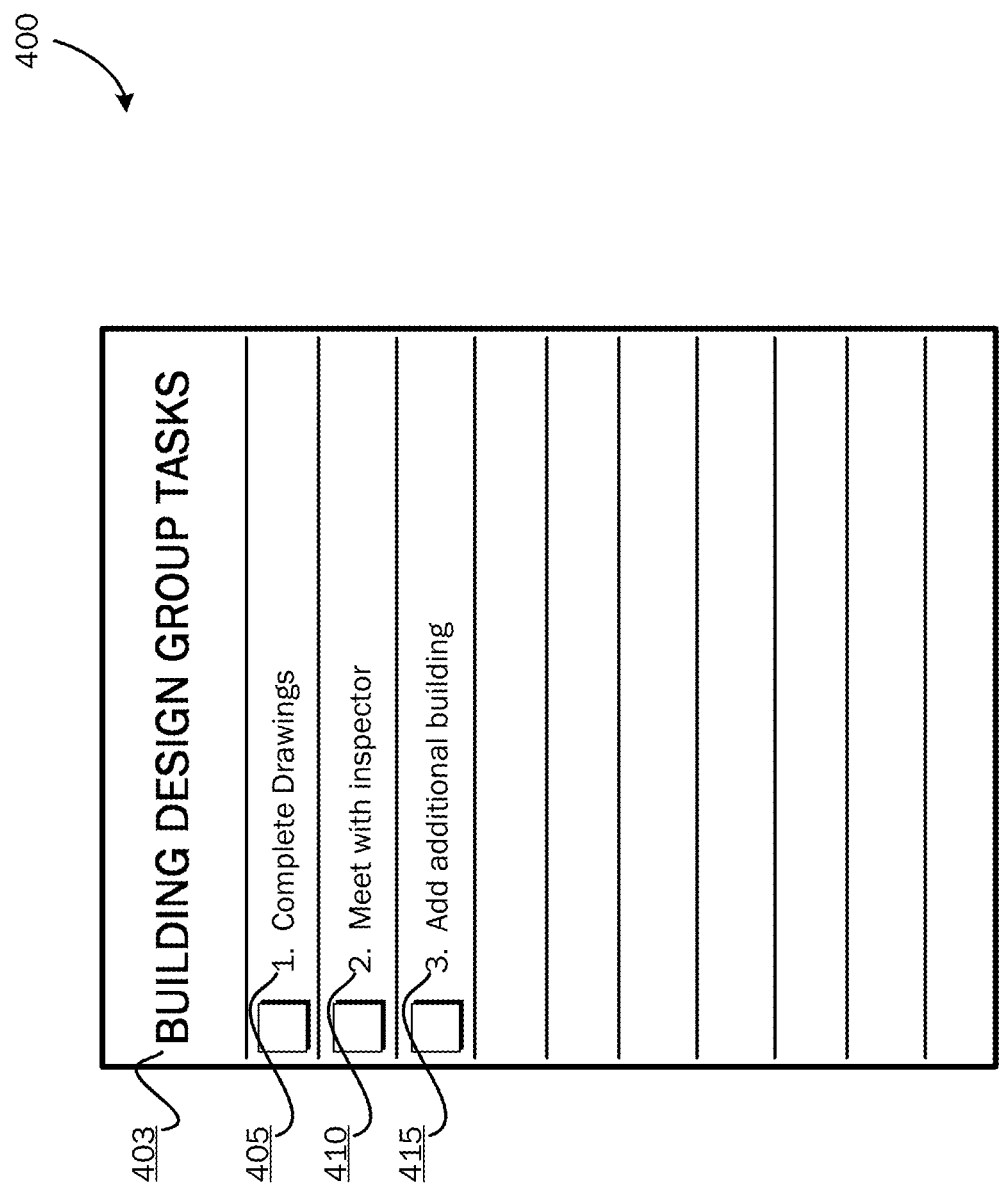
FIG. 4 illustrates a screen shot of a computer-generated user interface showing an example project group tasks list and showing example tasks contained therein.

FIG. 4 illustrates a screen shot of a computer-generated user interface showing an example project group tasks list and showing example tasks contained therein. The user interface 400 illustrated at FIG. 4 is illustrative of a task list that may be presented by a tasks application for an individual user or for a project group or workspace to which it is associated. The example task list user interface 400 illustrated in FIG. 4 is illustrative of a task list for a project workspace identified as "Building Design Group Tasks" 403. In the user interface 400, three example task items 405, 410 and 415 are displayed for the example project group or workspace. As illustrated, the example task 415 of "Add additional building wing" is illustrative of a task automatically populated into the task list by user acceptance of the proposed task item as illustrated above in FIG. 3.

Figure 5:
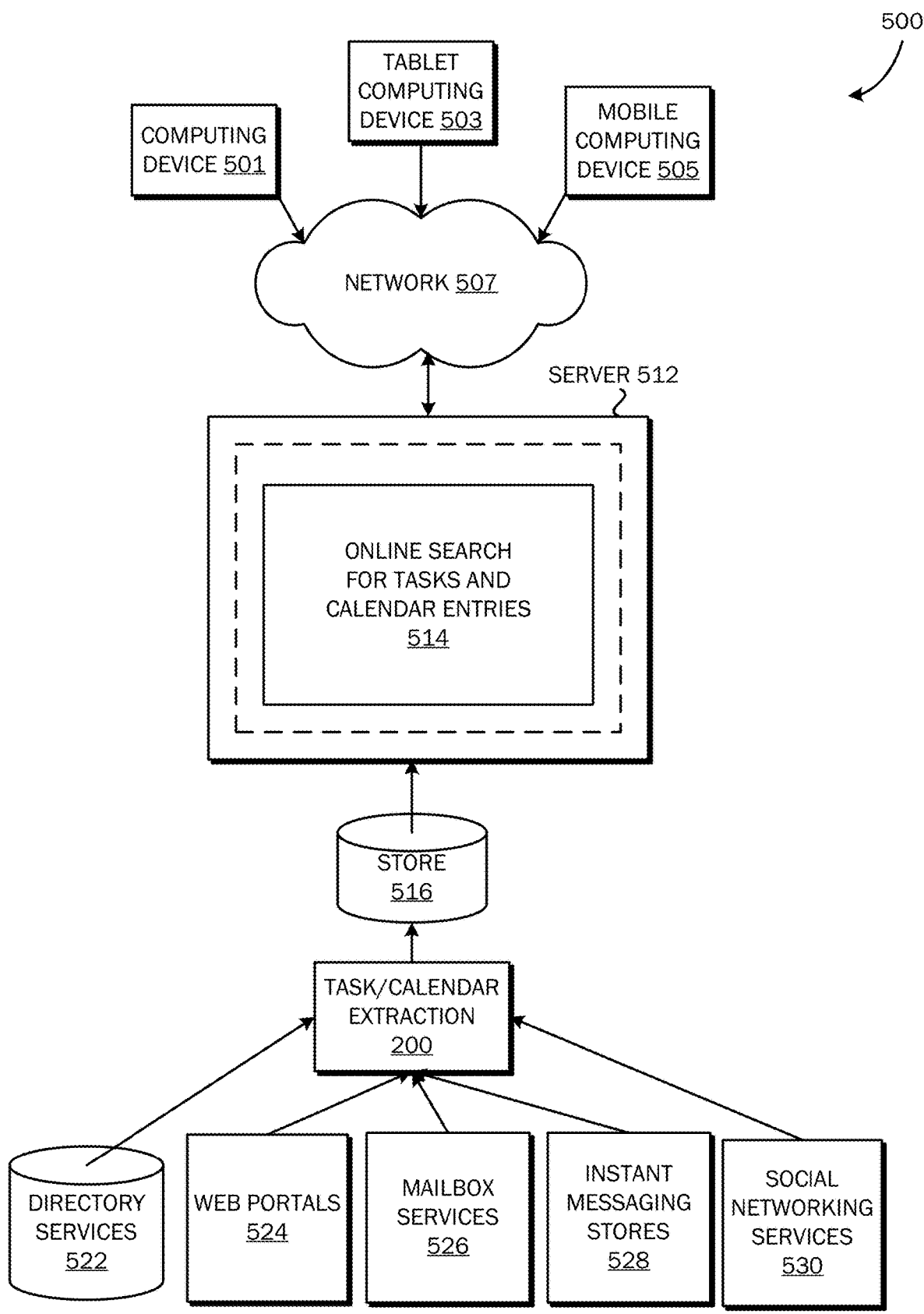
FIG. 5 illustrates a system architecture for distributing extracted task and/or calendar items to one or more receiving devices.

FIG. 5 illustrates a system architecture 500 for providing extracted tasks and calendar items to various client devices. As described previously, a task/calendar item extraction system 200 may generate and suggest extracted tasks and calendar items from information retrieved using a variety of communication channels and stores. Information and features helpful to extracting tasks and calendar items may also be stored in different communication channels or other storage types. For example, tasks and calendar items along with information from which they are extracted may be stored using directory services 522, web portals 524, mailbox services 526, instant messaging stores 528 and social networking sites 530. The system 200 may use any of these types of systems or the like for extracting tasks and calendar items and for storing same in a store 516. A server 512 may provide tasks and calendar items suggestions to clients. As one example, server 512 may be a web server providing tasks and calendar items suggestions over the web. Server 514 may provide online tasks and calendar items suggestions over the web to clients through a network 507. Examples of clients that may obtain thread summaries include computing device 501, which may include any general purpose personal computer, a tablet computing device 503 and/or mobile computing device 505 which may include smart phones. Any of these devices may obtain tasks and calendar items from the store 516.

As described above, embodiments of the invention may be implemented via local and remote computing and data storage systems, including the systems illustrated and described with reference to FIGS. 1, 2, 3, 4 and 5. Consistent with embodiments of the invention, the aforementioned memory storage and processing unit may be implemented in a computing device, such as computing device 600 of FIG. 6. According to embodiments, the computing device may be in the form of a personal computer, server computer, hand-held computer, smart phone, tablet or slate device, or any other device capable of containing and operating the computing components and functionality described herein. In addition, the computing device components described below may operate as a computing system printed on a programmable chip. Any suitable combination of hardware, software, or firmware may be used to implement the memory storage and processing unit. For example, the memory storage and processing unit may be implemented with computing device 600 or any other computing devices 618, in combination with computing device 600, wherein functionality may be brought together over a network in a distributed computing environment, for example, an intranet or the Internet, to perform the functions as described herein. The aforementioned system, device, and processors are examples and other systems, devices, and processors may comprise the aforementioned memory storage and processing unit, consistent with embodiments of the invention. Furthermore, computing device 600 may comprise operating environment 100 as described above.

Figure 6:
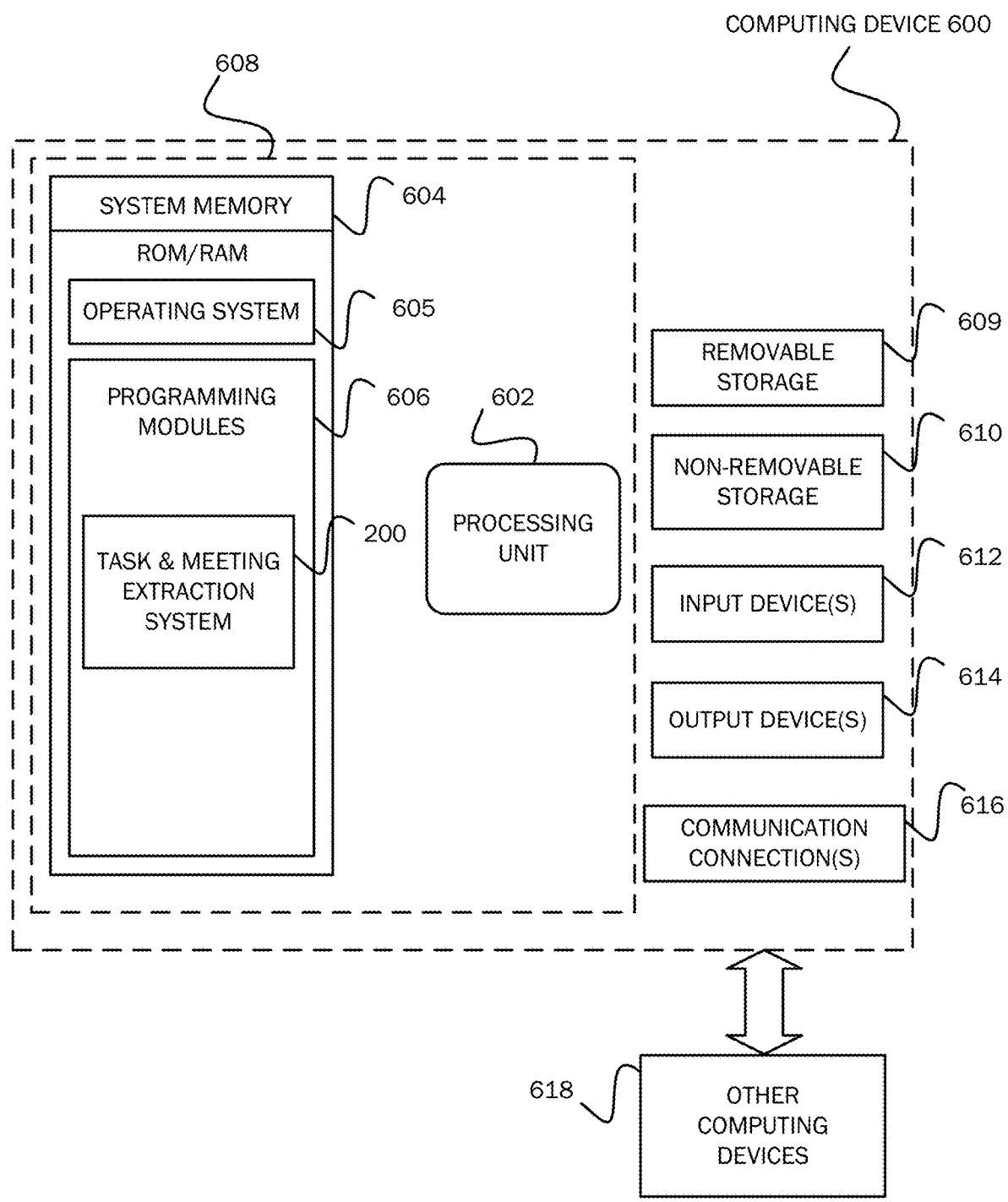
FIG. 6 is a block diagram of a system including a computing device with which embodiments of the invention may be practiced.

With reference to FIG. 6, a system consistent with embodiments of the invention may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include the conversation topic detection, generation and storage system 200 having sufficient computer-executable instructions, which when executed, performs functionalities as described herein. Operating system 605, for example, may be suitable for controlling computing device 600's operation. Furthermore, embodiments of the invention may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computing device 600 may also contain a communication connection 616 that may allow device 600 to communicate with other computing devices 618, such as over a network in a distributed computing environment, for example, an intranet or the Internet. Communication connection 616 is one example of communication media.

As stated above, a number of program modules and data files may be stored in system memory 604, including operating system 605. While executing on processing unit 602, programming modules 606 and may include the task and calendar item extraction system 200 which may include program modules containing sufficient computer-executable instructions, which when executed, perform functionalities as described herein. The aforementioned process is an example, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, microcode, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The term computer readable media as used herein may include computer storage media. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method comprising:
   receiving a communication item;
   identifying one or more text components of the communication item;
   extracting one or more features from the one or more text components, wherein the one or more features are usable to classify the communication item as a task or calendar item;
   identifying a plurality of users associated with the one or more features;
   comparing, by a machine-learning classifier, the one or more features to project data associated with the plurality of users;
   based on the comparison, assigning a probability that the communication item is the task item or the calendar item;
   based on the probability, generating a candidate event item corresponding to the task item or the calendar item; and
   providing the candidate event item for display.

2. The method of claim 1, wherein the communication item is at least one of:
   an email;
   a text message;
   a chat session communication; or
   a file attachment.

3. The method of claim 1, wherein one or more text components comprise at least one of:
   words;
   phrases;
   numeric strings; or
   sentences.

4. The method of claim 1, wherein the one or more features comprise at least one of:
   a recipient name of the communication item;
   a date;
   a time; or
   a subject line.

5. The method of claim 1, wherein the plurality of users are members of a project or workspace associated with the project data.

6. The method of claim 1, wherein the project data is stored in a project workspace associated with a sender of the communication item and one or more recipients of the communication item.

7. The method of claim 1, wherein the machine-learning classifier is combined with one or more manually predefined text component patterns.

8. The method of claim 1, wherein generating the candidate event item comprises:
   extracting at least one of slots or properties from the one or more features; and
   assembling the candidate event item using the slots or the properties.

9. The method of claim 1, wherein the candidate event item comprises:
   a first field enabling a user to manually replace the candidate event item with a replacement event item; and
   a second field comprising editable slot information for the candidate event item or the replacement event item.

10. The method of claim 9, wherein the editable slot information comprises at least one of:
    a due date;
    a task assignee;
    a task topic;
    an event date or event time; or
    an event attendee.

11. The method of claim 1, wherein acceptance of the candidate event item by a first user causes the candidate event item to be automatically populated in an event tracking application of the first user.

12. The method of claim 11, wherein the acceptance of the candidate event item by the first user causes the candidate event item to be presented to a second user associated with the project data.

13. A system comprising:
    a processor; and
    memory coupled to the processor, the memory comprising computer executable instructions that, when executed by the processor, performs a method comprising:
       receiving a communication item;
       identifying one or more text components of the communication item;
       extracting one or more features from the one or more text components, wherein the one or more features are usable to classify the communication item as a task or calendar item;
       identifying a plurality of users associated with the one or more features;
       comparing, by a machine-learning classifier, the one or more features to project data associated with the plurality of users;
       based on the comparison, assigning a probability that the communication item is the task item or the calendar item;
       based on the probability, generating a candidate event item corresponding to the task item or the calendar item; and
       providing the candidate event item for display.

14. The system of claim 13, wherein identifying the one or more text components comprises extracting text and metadata from the communication item.

15. The system of claim 13, wherein the one or more text components are represented as feature vectors and the feature vectors are provided as input to the machine-learning classifier.

16. The system of claim 13, wherein the machine-learning classifier is a linear support vector.

17. The system of claim 13, wherein the method performed by the computer executable instructions further comprises:
    receiving, from a user, an acceptance of the candidate event item; and
    in response to the acceptance of the candidate event item, automatically populating the candidate event item in an event tracking application of the user.

18. The system of claim 17, wherein automatically populating the candidate event item in the event tracking application of the user causes the candidate event item to be populated in respective event tracking applications of the plurality of users.

19. The system of claim 13, wherein the method performed by the computer executable instructions further comprises:
- receiving, from a user, a rejection of the candidate event item; and
- in response to the rejection of the candidate event item, enabling the user to modify the candidate event item.

20. A computing device comprising a messaging application stored on a non-transitory computer readable storage medium, wherein the computing device is operable to:
- receive a communication item;
- identify one or more text components of the communication item;
- extract one or more features from the one or more text components, wherein the one or more features are usable to classify the communication item as a task or calendar item;
- identify a plurality of users associated with the one or more features;
- compare, by a machine-learning classifier, the one or more features to project data associated with the plurality of users;
- based on the comparison, assign a probability that the communication item is the task item or the calendar item;
- based on the probability, generate a candidate event item corresponding to the task item or the calendar item; and
- provide the candidate event item for display.

* * * * *